(12) United States Patent
Van de Wal et al.

(10) Patent No.: US 10,667,970 B2
(45) Date of Patent: Jun. 2, 2020

(54) SWING ARM ASSEMBLY FOR A MID-WHEEL DRIVE WHEELCHAIR

(71) Applicant: Permobil AB, Timrå (SE)

(72) Inventors: Herbert Van de Wal, Alnö (SE); Anton Danielsson, Sundsvall (SE)

(73) Assignee: Permobil AB (SE)

( * ) Notice: Subject to any disclaimer, the term of this patent is extended or adjusted under 35 U.S.C. 154(b) by 166 days.

(21) Appl. No.: 15/878,091

(22) Filed: Jan. 23, 2018

(65) Prior Publication Data

US 2018/0214325 A1 Aug. 2, 2018

(30) Foreign Application Priority Data

Jan. 31, 2017 (EP) ..................................... 17154013

(51) Int. Cl.
*A61G 5/10* (2006.01)
*A61G 5/04* (2013.01)

(52) U.S. Cl.
CPC ............ *A61G 5/1078* (2016.11); *A61G 5/043* (2013.01); *A61G 5/1089* (2016.11); *B60G 2300/24* (2013.01)

(58) Field of Classification Search
CPC ........ A61G 5/06; A61G 5/043; A61G 5/1078; A61G 5/1079; A61G 5/1089; B60G 2300/24
See application file for complete search history.

(56) References Cited

U.S. PATENT DOCUMENTS

| 7,413,038 B2* | 8/2008 | Mulhern ................ A61G 5/042 180/22 |
| 9,022,400 B2* | 5/2015 | Porcheron .............. A61G 5/045 280/124.104 |
| 10,206,832 B2* | 2/2019 | Danielsson .......... A61G 5/1078 |
| 2005/0206149 A1* | 9/2005 | Mulhern ................ A61G 5/043 280/755 |
| 2006/0076748 A1* | 4/2006 | Pauls ..................... A61G 5/043 280/124.11 |

(Continued)

FOREIGN PATENT DOCUMENTS

| AU | 2009100221 A4 | 4/2009 |
| EP | 1435889 A1 | 7/2004 |

(Continued)

OTHER PUBLICATIONS

Extended Search Report for European Application No. 17154013.1 dated Jul. 21, 2017, 7 pages.

*Primary Examiner* — Ruth Ilan
(74) *Attorney, Agent, or Firm* — McAndrews, Held & Malloy, Ltd.

(57) ABSTRACT

The present disclosure relates to a swing arm assembly (1) for a mid-wheel drive wheelchair (21), comprising: a front swing arm (3) having a front swing arm pivot point (3a), a drive assembly swing arm (5) having a drive assembly swing arm pivot point (5a) and a resilient member first mounting point (5b), a rear swing arm (7) having a rear swing arm pivot point (7a) and a resilient member second mounting point (7b), and a resilient member (9) configured to be connected to the resilient member first mounting point (5a) and to the resilient member second mounting point (7a) to enable force transfer between the drive assembly swing arm (5) and the rear swing arm (7).

17 Claims, 3 Drawing Sheets

(56) References Cited

U.S. PATENT DOCUMENTS

| | | | |
|---|---|---|---|
| 2007/0018418 A1* | 1/2007 | Huang | A61G 5/043 280/124.111 |
| 2007/0039766 A1* | 2/2007 | Jackson | A61G 5/043 180/65.1 |
| 2008/0083573 A1* | 4/2008 | Tseng | A61G 5/043 180/65.1 |
| 2010/0084209 A1* | 4/2010 | Bekoscke | A61G 5/1089 180/209 |
| 2010/0102529 A1 | 4/2010 | Lindenkamp | |
| 2010/0213683 A1* | 8/2010 | Vreeswijk | A61G 5/043 280/149.2 |
| 2011/0012316 A1* | 1/2011 | Cheng | A61G 5/043 280/5.514 |
| 2011/0253464 A1* | 10/2011 | Chen | A61G 5/043 180/65.1 |
| 2012/0217713 A1 | 8/2012 | Molnar | |
| 2013/0207364 A1* | 8/2013 | Bekoscke | A61G 5/10 280/124.104 |
| 2014/0339004 A1 | 11/2014 | Beard et al. | |
| 2015/0107917 A1* | 4/2015 | Wu | A61G 5/06 180/24.02 |
| 2015/0283010 A1 | 10/2015 | Cuson | |

FOREIGN PATENT DOCUMENTS

| | | | | |
|---|---|---|---|---|
| EP | 2441423 A1 * | 4/2012 | | A61G 5/043 |
| EP | 2716268 A2 | 4/2014 | | |
| EP | 2716268 A3 | 4/2015 | | |
| EP | 3348248 A1 * | 7/2018 | | A61G 5/06 |
| WO | 03034969 A1 | 5/2003 | | |
| WO | 2003034969 A1 | 5/2003 | | |

* cited by examiner

SWING ARM ASSEMBLY FOR A MID-WHEEL DRIVE WHEELCHAIR

CROSS-REFERENCE TO RELATED APPLICATIONS/INCORPORATION BY REFERENCE

The present application claims priority to European Patent Application No. 17154013.1, filed Jan. 31, 2017. The content of the above-identified application is hereby incorporated herein by reference in its entirety.

TECHNICAL FIELD

The present disclosure generally relates to mid-wheel drive wheelchairs. In particular, it relates to a swing arm assembly for a mid-wheel drive wheelchair and to a mid-wheel drive wheelchair comprising such a swing arm assembly.

BACKGROUND

Mid-wheel drive wheelchairs have front wheels, rear wheels, and drive wheels arranged between the front wheels and the rear wheels. The front and rear wheels may typically be caster-type wheels.

In comparison to front-wheel and rear-wheel driven wheelchairs, mid-wheel drive wheel chairs are sometimes considered to present a better manoeuvrability, mainly in terms of a lesser turning radius. In addition to manoeuvrability, some other aspects when designing and configuring a wheelchair are stability, ride comfort and the ability for a wheel suspension assembly to ensure that all wheels are in contact with the ground at all times. Stability may in one aspect be defined as the ability of preventing tipping of the wheelchair about its pitch axis, e.g. tipping over in the forward or rearward direction, or lifting of rear or front caster wheels when driving on a ramp or a slope.

It is especially important that the drive wheels maintain traction against the ground since the wheelchair otherwise will lose its ability to be driven, in any direction. The risk for loss of tractive force increases when operating the wheelchair on a non-planar surface, e.g. on uneven ground. The phenomena when such a situation occurs for a mid-wheel drive wheelchair is sometimes referred to as high-centring, meaning that at least one of the drive wheels has lost contact with the ground. There is also an increased risk of losing traction when entering or leaving a slope, downhill or uphill.

Comfort may in one aspect be defined as the level of vibrations and/or impact transferred from the ground to the user. A low level of transferred vibrations is experienced as more comfortable by the user.

In order to improve the ability to maintain traction to the ground, the swing arms, i.e. arms to which the wheels are mounted, of a wheelchair suspension are preferably connected to each other. For user comfort, on the other hand, it is preferable to have a fully independent suspension where one wheel movement does not affect any other.

US2008/0083573 addresses issues relating to high-centring or traction loss of the drive wheel. Hereto, US2008/0083573 discloses a vehicle including a chassis, a driving unit including a mounting seat pivoted to the chassis, a driving member mounted on the mounting seat, and two driving wheels mounted rotatably on the mounting seat and driven by the driving member. The vehicle further includes two front wheel units, each including a front lever having first and second ends and pivoted to the chassis, a front wheeled member connected to the first end, and a first cushioning member pivoted to the second end and the mounting seat for urging the front lever to rotate, and two rear wheel units, each including a rear lever having first and second ends and pivoted to the chassis, a rear wheeled member connected to the first end, a second cushioning member pivoted to the first end and the mounting seat, and a linkage pivoted to the second end of the rear lever and the mounting seat.

US2014/0339004 aims at providing a suspension for a wheelchair which facilitates for a wheelchair to traverse obstacles by aiding the front casters in overcoming the obstacle. Hereto, this document discloses a suspension for a wheelchair which includes a drive assembly and a front caster pivot arm. The drive assembly and the front caster pivot arm are pivotally connected to the frame such that the drive assembly and the front caster pivot arm are pivotable relative to each other. The drive assembly and the front caster pivot arm are coupled to enhance the vehicle's ability to traverse obstacles.

SUMMARY

The drive wheels of a mid-wheel drive wheelchair are typically arranged directly beneath the user's centre of gravity. When driving over obstacles or rough terrain, this may create discomfort for the user, because the vibration input of the drive wheels is directly beneath the user and is transferred directly to or near the centre of gravity of the user.

Using a suspension linkage between the front arm and drive wheel arm, as for example disclosed in US2008/0083573, leads to a need for a very stiff set-up, because this link also needs to provide stability, for example during braking. This stiff set-up will however impact the level of comfort experienced by the user.

In view of the above, a general object of the present disclosure is to provide a swing arm assembly for a mid-wheel drive wheelchair which solves or at least mitigates the problems of the prior art.

There is hence according to a first aspect of the present disclosure provided a swing arm assembly for a mid-wheel drive wheelchair, comprising: a front swing arm having a front swing arm pivot point, a drive assembly swing arm having a drive assembly swing arm pivot point and a resilient member first mounting point, a rear swing arm having a rear swing arm pivot point and a resilient member second mounting point, and a resilient member configured to be connected to the resilient member first mounting point and to the resilient member second mounting point to enable force transfer between the drive assembly swing arm and the rear swing arm.

By means of the resilient member configured to be connected between the rear swing arm and the drive assembly swing arm, the ride comfort for the user may be improved. In particular, since the resilient member is connected between the rear swing arm and the drive assembly swing arm, for force transfer therebetween, and thus not primarily used for achieving stability, which would require a certain relatively high stiffness, the resilient member can be tuned for comfort.

A "swing arm" or equivalently, "pivot arm" is construed to be an arm configured to be pivotally mounted at some point along the extension of the arm. The arm is thus able to swing or pivot about its pivot axis.

According to one embodiment the resilient member is configured to be pivotally connected to the drive assembly swing arm via the resilient member first mounting point, and configured to be pivotally connected to the rear swing arm via the resilient member second mounting point.

One embodiment comprises a frame, wherein at least one of the front swing arm, the drive assembly swing arm and the rear swing arm is configured to be pivotally connected to the frame with the corresponding swing arm pivot point defining the pivot point of the said swing arm relative to the frame.

The frame is the main bearing structure to which the front swing arm, the drive assembly swing arm and the rear swing arm are configured to be mounted, either directly or indirectly. In particular, the suspension system of the mid-wheel drive wheelchair, which includes the previously mentioned swing arms, is configured to be mounted to the frame.

According to one embodiment the front swing arm is configured to be pivotally connected to the frame with the front swing arm pivot point defining the pivot point of the front swing arm relative to the frame, the drive assembly swing arm is configured to be pivotally connected to the frame with the drive assembly swing arm pivot point defining the pivot point of the drive assembly swing arm relative to the frame, and the rear swing arm is configured to be pivotally connected to the frame with the rear swing arm pivot point defining the pivot point of the rear swing arm relative to the frame.

In an embodiment where all swing arms are attached to the frame via the respective pivot point, it is easier to maintain rigidity in the sense of maintaining a desired wheel alignment and/or limit undesired movement of swing arms. Such a configuration may also more easily achieve a higher degree of independent suspension for the individual wheels.

One embodiment comprises a linkage member, wherein the front swing arm has a linkage member first mounting point and the rear swing arm has a linkage member second mounting point, and wherein the linkage member is configured to be connected to the linkage member first mounting point and the linkage member second mounting point to enable force transfer between the front swing arm and the rear swing arm.

The swing arm assembly hence allows for a mid-wheel drive wheelchair suspension that is stable, is able to maintain the wheel pairs in ground contact to a higher degree, and is more comfortable to the user.

By means of the configuration of the front swing arm, the rear swing arm and the drive assembly swing arm, including the connections with the resilient member and the linkage member, when the front swing arm is being pivoted, force is first transmitted from the front swing arm to the rear swing arm via the linkage member, causing movement of the rear swing arm. This movement of the rear swing arm transmits force to the drive assembly swing arm via the resilient member.

Furthermore, the swing arm assembly provides traction for the drive wheels for larger ditch angles. The ditch angle is defined as the acute angle between two planes, a first plane that is tangent to both the front caster wheel contact point to the ground and a ground contact point of the drive wheel, and a second plane that is tangent to the rear caster wheel ground contact point and a drive wheel ground contact point.

According to one embodiment the linkage member is flexible in its longitudinal direction. In particular, individual tuning of the resilient member and of the linkage member may thereby be provided, with the former handling comfort duties and the latter handling stability. It is to be noted that it is not only the characteristics of the individual parts, i.e. the resilient member and the linkage member per se, that may provide the required attributes concerning comfort and stability, but also how they are positioned in relation to adjacent parts.

According to one embodiment the linkage member is stiffer than the resilient member.

According to one embodiment the rear swing arm pivot point is configured to be spaced apart from the front swing arm pivot point and the drive assembly swing arm pivot point, wherein the front swing arm pivot point is configured to coincide with the drive assembly swing arm pivot point.

According to one embodiment the drive assembly swing arm has a surface configured to allow a drive assembly to be mounted thereto.

According to one embodiment the resilient member comprises a spring.

There is according to a second aspect of the present disclosure provided a mid-wheel drive wheelchair comprising a swing arm assembly according to the first aspect presented herein.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figure 1A:
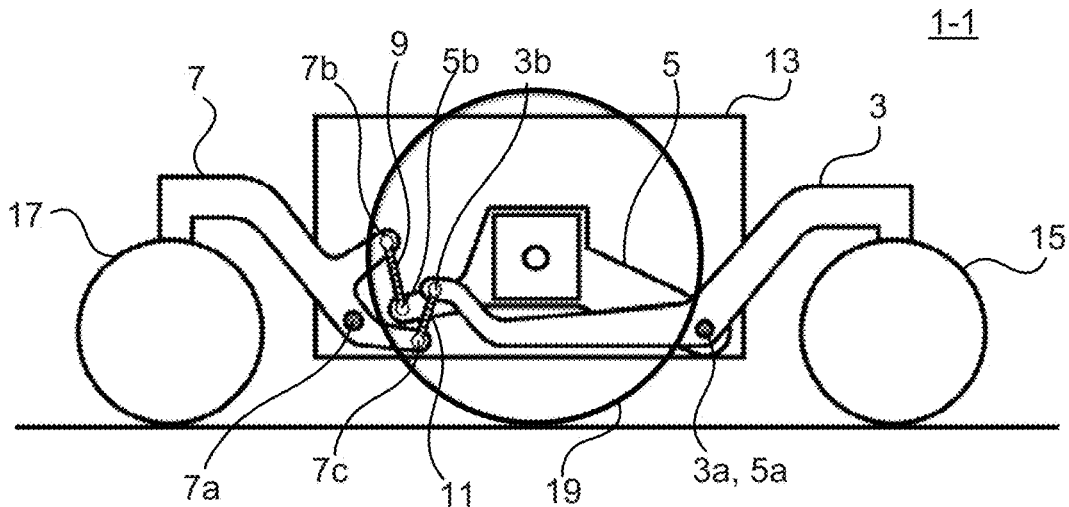
FIGS. 1a-e show side views of examples of a swing arm assembly.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a swing arm assembly for a mid-wheel drive wheelchair. The swing arm assembly comprises three swing arms, each being configured to be pivotable relative to a respective pivot point. A first of the three swing arms is a front swing arm, or a front pivot arm, having a front swing arm pivot point on an axis about which the front swing arm is configured to pivot, a second of the three swing arms is a drive assembly swing arm, or drive assembly pivot arm, having a drive assembly swing arm pivot point on an axis about which the drive assembly swing arm is configured to pivot, and a third of the three swing arm assemblies is a rear swing arm, or rear pivot arm, having a rear swing arm pivot point on an axis about which the rear swing arm is configured to pivot.

The front swing arm may be a front wheel swing arm or front wheel pivot arm, the drive assembly swing arm may be a drive wheel swing arm or drive wheel pivot arm, and the rear swing arm may be a rear wheel swing arm or rear wheel pivot arm. Hereto, the front swing arm may be configured for mounting a wheel thereto, for example a front caster wheel. The rear swing arm may be configured for mounting a wheel thereto, for example rear caster wheel. The drive assembly swing arm may be configured for mounting a drive wheel thereto. The drive assembly swing arm may also be configured for mounting a drive assembly thereto.

The drive assembly swing arm furthermore has a resilient member first mounting point and the rear swing arm has a resilient member second mounting point.

The swing arm assembly also comprises a resilient member configured to be connected to the resilient member first mounting point and to the resilient member second mounting point. The resilient member is hence configured to extend between the rear swing arm and the drive assembly swing arm. In particular, the resilient member is configured to extend between the resilient member first mounting point and the resilient member second mounting point. Force may thereby be transferred between the rear swing arm and the drive assembly swing arm via the resilient member.

The swing arm assembly may further comprise a frame for a mid-wheel drive wheelchair, and one or more of the three swing arms may be configured to be pivotally connected to the frame. The pivot points or axes, defined by the front swing arm pivot point, the drive assembly swing arm pivot point and the rear swing arm pivot point, could for example be distinct pivot points, or two of the swing arms may share pivot point and thus pivot axis. To this end, the drive assembly swing arm pivot point may for example coincide with the front swing arm pivot point or it may coincide with the rear swing arm pivot point, or all three pivot points/axes may be distinct and spaced apart relative to each other.

The swing arm assembly, in any variation described herein, of course includes a pair of each of the front swing arm, the drive assembly swing arm, and of the rear swing arm. There is hence a left and a right front swing arm, a left and a right drive assembly swing arm and a left and a right rear swing arm. There are also two resilient members, one for each of the left hand side swing arms and one for the right hand side swing arms. Furthermore, examples which include a linkage member and/or a shock absorber also have two of each such component, one each for the left side and the right side of the swing arm assembly. Generally, the left side and the right side are mirror images of each other.

Examples of a swing arm assembly will now be described with reference to FIGS. 1a-1e.

FIG. 1a schematically shows an example of a swing arm assembly 1-1 for a mid-wheel drive wheelchair. The exemplified swing arm assembly 1-1 comprises a front swing arm 3, a drive assembly swing arm 5, and a rear swing arm 7.

The drive assembly swing arm 5 is configured to be arranged between the front swing arm 3 and the rear swing arm 7, seen in a direction from the front towards the back of the swing arm assembly 1.

The front swing arm 3 has a front swing arm pivot point 3a on an axis about which the front swing arm 3 is configured to pivot. The drive assembly swing arm 5 has a drive assembly swing arm pivot point 5a on an axis about which the drive assembly swing arm 5 is configured to pivot. The rear swing arm 7 has a rear swing arm pivot point 7a on an axis about which the rear swing arm 7 is configured to pivot.

The front swing arm 3 may be configured for mounting of a front wheel 15, for example a front caster wheel, to a distal end thereof, relative to the front swing arm pivot point 3a. The rear swing arm 7 may be configured for mounting a rear wheel 17, for example a rear caster wheel, to a distal end thereof. The front swing arm 3 may in this case be a front caster arm and the rear swing arm 7 may in this case be a rear caster arm.

According to the example shown in FIG. 1a, the front swing arm pivot point 3a coincides with the drive assembly swing arm pivot point 5a. However, as noted above, alternative configurations are also envisaged; for example, the drive assembly swing arm pivot point may coincide with the rear swing arm pivot point, or each of the front swing arm pivot point, the drive assembly swing arm pivot point and the rear swing arm pivot point may form distinct pivot points.

The swing arm assembly 1-1 also comprises a resilient member 9 configured to be connected between the drive assembly swing arm 5 and the rear swing arm 7 to thereby enable force transfer between the drive assembly swing arm 5 and the rear swing arm 7. The resilient member 9 is configured to be flexible or elastic, i.e. compressible and/or extendable in the direction of force transfer. Preferably, the resilient member 9 is configured to be compressible from its neutral starting position. The resilient member 9 may have an elongated shape, and the resilient member 9 may be flexible or elastic in the axial, or longitudinal, direction thereof. The resilient member 9 may according to one variation also be configured to flex relative to the axial or longitudinal direction, i.e. to be bent relative to the central axis thereof.

The resilient member 9 may for example comprise a spring, such as a coil spring, a flat spring, a machined spring, or any other suitable spring, and/or the resilient member 9 may comprise an elastic material such as a polymer material, which provides the necessary elasticity in the above-described direction or directions.

The drive assembly swing arm 5 has a resilient member first mounting point 5b and the rear swing arm 7 has a resilient member second mounting point 7b to which the resilient member 9 is configured to be connected. In particular, the resilient member 9 may be configured to be pivotally connected to the resilient member first mounting point 5b and also to the resilient member second mounting point 7b. Relative rotation between the drive assembly swing arm 5 and the rear swing arm 7 and the resilient member 9 may thereby be provided.

In FIG. 1a, the resilient member 9 is connected to the resilient member first mounting point 5b and the resilient member second mounting point 7b. The resilient member 9 hence extends between the resilient member first mounting point 5b and the resilient member second mounting point 7b. Thus, when the rear swing arm 7 is pivoted about the rear swing arm pivot point/axis, this motion will cause force transfer between the rear swing arm 7 and the drive assembly swing arm 5 via the resilient member 9.

The exemplified swing arm assembly 1-1 shown in FIG. 1a additionally comprises a linkage member 11 configured to be connected between the front swing arm 3 and the rear swing arm 7. Hereto, the front swing arm 3 has a linkage member first mounting point 3b and the rear swing arm 7 has a linkage member second mounting point 7c to which the linkage member 11 is configured to be pivotally connected. The linkage member 11 is configured to transfer force between the front swing arm 3 and the rear swing arm 7.

The linkage member 11 may be configured to be flexible or elastic, i.e. compressible and/or extendable in the direction of force transfer. The linkage member 11 may have an elongated shape, and it may be flexible or elastic in the axial, or longitudinal, direction thereof. The linkage member 11 may according to one variation also be configured to flex relative to the axial or longitudinal direction, i.e. to be bent relative to the central axis thereof.

The linkage member 11 may for example comprise a spring, such as a coil spring, a flat spring, a machined spring, or any other suitable spring, and/or the linkage member 11 may comprise an elastic material such as a polymer material, which provides the necessary elasticity in the above-described direction or directions.

By means of the resilient member and linkage member configuration it is possible to tune the resilient member and linkage member to optimize for both comfort and stability. The linkage member may for example be selected to be stiffer than the resilient member concerning axial flexibility in the sense of compressibility and expandability. The tuning may also involve adjusting the placement of the resilient member and the linkage member in relation to adjacent parts, thereby achieving an optimal result for both comfort and stability.

The swing arm assembly 1 comprises a frame 13. According to the example shown in FIG. 1a, each of the front swing arm 3, the drive assembly swing arm 5 and the rear swing arm 7 is configured to be pivotally connected to the frame 13. The front swing arm 3 is configured to be pivotally connected to the frame 13 via the front swing arm pivot point 3a. To this end, the front swing arm pivot point 3a defines the pivot point on an axis about which the front swing arm 3 is configured to pivot relative to the frame 13. The drive assembly swing arm 5 is configured to be pivotally connected to the frame 13 via the drive assembly swing arm pivot point 5a. The drive assembly swing arm pivot point 5a hence defines the pivot point on an axis about which the drive assembly swing arm 5 is configured to pivot relative to the frame 13. The rear swing arm 7 is configured to be pivotally connected to the frame 13 via the rear swing arm pivot point 7a. Hereto, the rear swing arm pivot point 7a defines the pivot point on an axis about which the rear swing arm 7 is configured to pivot relative to the frame 13.

The drive assembly swing arm 5 may according to one variation be provided with a surface to which a drive assembly for driving a mid-wheel wheelchair may be mounted. Hereto, this surface may be configured to accommodate and to enable mounting of the drive assembly to the drive assembly swing arm 5. This configuration makes the drive assembly pivotable relative to the frame 13 due to it being mounted to the pivotable drive assembly swing arm 5. A drive wheel 19 may be mounted to the drive assembly, as schematically illustrated in FIG. 1a.

Figure 1B:
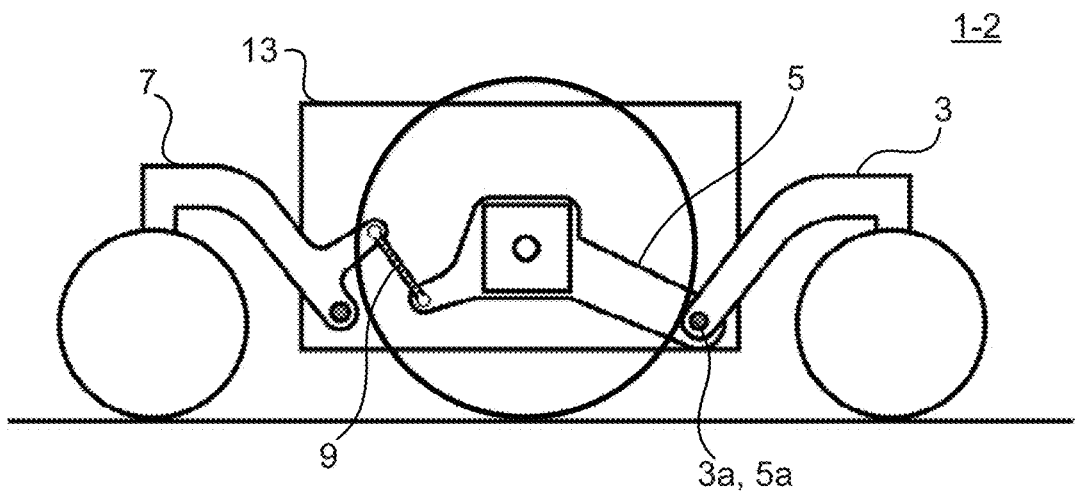

FIG. 1b schematically shows another example of a swing arm assembly 1-2 similar to the swing arm assembly 1-1. In this example, the front swing arm pivot point 3a and the drive assembly swing arm pivot point 5a coincide, and thus the front swing arm 3 and the drive assembly swing arm 5 have a common pivot axis about which they are able to pivot relative to the frame 13. In contrast to the example in FIG. 1a, swing arm assembly 1-2 does not have a front swing arm 3 that is pivotally connected to the rear swing arm 5 by means of a linkage member. As a variation of this example, the pivot points of the swing arms 3, 5 and 7 may be distinct, each swing arm 3, 5, 7 being configured to pivot about a pivot axis spaced apart from the pivot axes of the other swing arms.

Figure 1C:
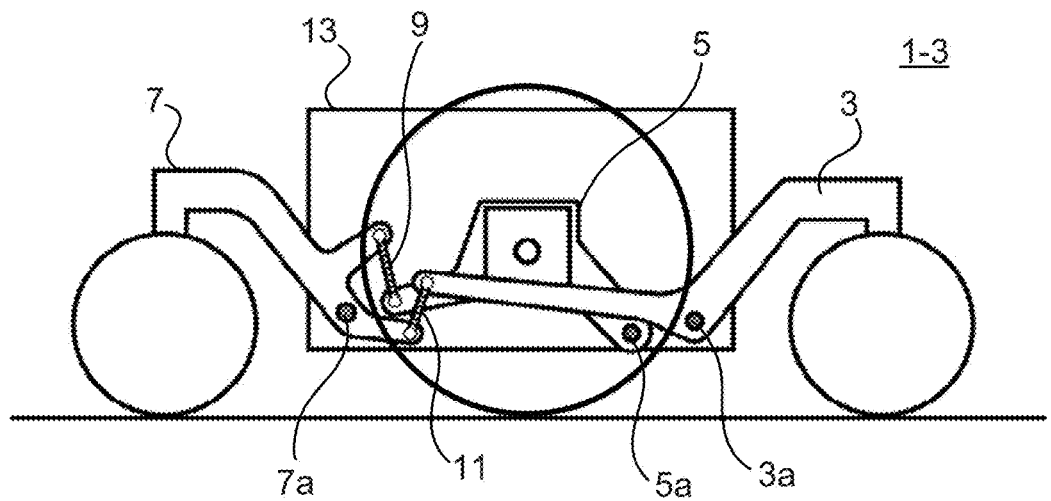

In FIG. 1c, an example of a swing arm assembly 1-3 is shown, in which the front swing arm pivot point 3a and the drive assembly swing arm pivot point 5a are spaced apart relative to each other, i.e. do not coincide. In this case, the front swing arm 3 and the drive assembly swing arm 5 have different pivot axes about which they are able to pivot relative to the frame 13.

Figure 1D:
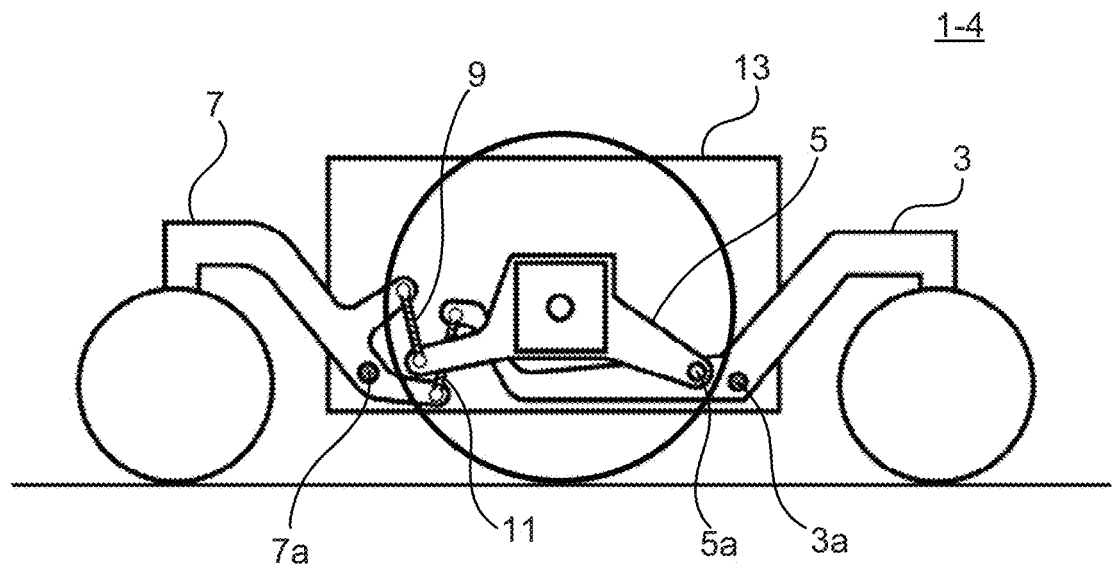

FIG. 1d shows an example of a swing arm assembly 1-4, in which the front swing arm 3 is connected to the frame 13 via the front swing arm pivot point 3a and the rear swing arm is connected to the frame via the rear swing arm pivot point 7a. The drive assembly swing arm 5 is pivotally connected to the front swing arm 3 via the drive assembly swing arm pivot point 5a. The drive assembly swing arm 5 is hence configured to pivot about a pivot axis on which the drive assembly swing arm pivot point is located, providing a pivot connection between the drive assembly swing arm 5 and the front swing arm 3.

Figure 1E:
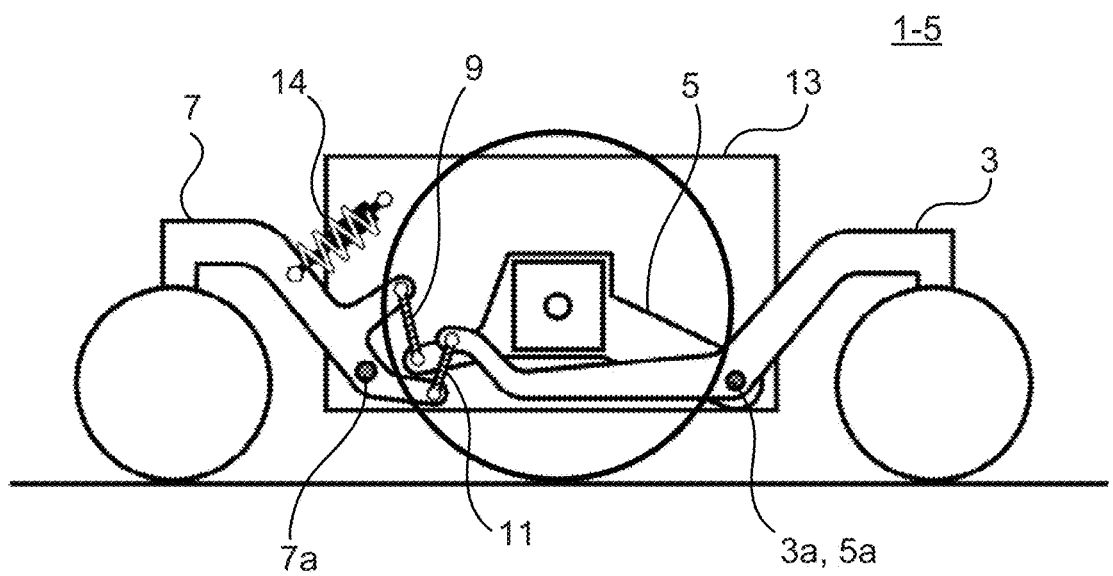

FIG. 1e shows another example of a swing arm assembly. Swing arm assembly 1-5 additionally includes a shock absorber 14. The shock absorber 14 is configured to be connected between the rear swing arm 7 and the frame 13. Alternatively, the shock absorber 14 could instead be configured to be connected between the front swing arm and the frame, or between the drive assembly swing arm and the frame. The shock absorber 14 is configured to provide resistance in the suspension to provide increased stability. By means of a set-up including also the resilient member 9 and the linkage member 11, the shock absorber 14 may be optimized for stability purposes.

Figure 2:
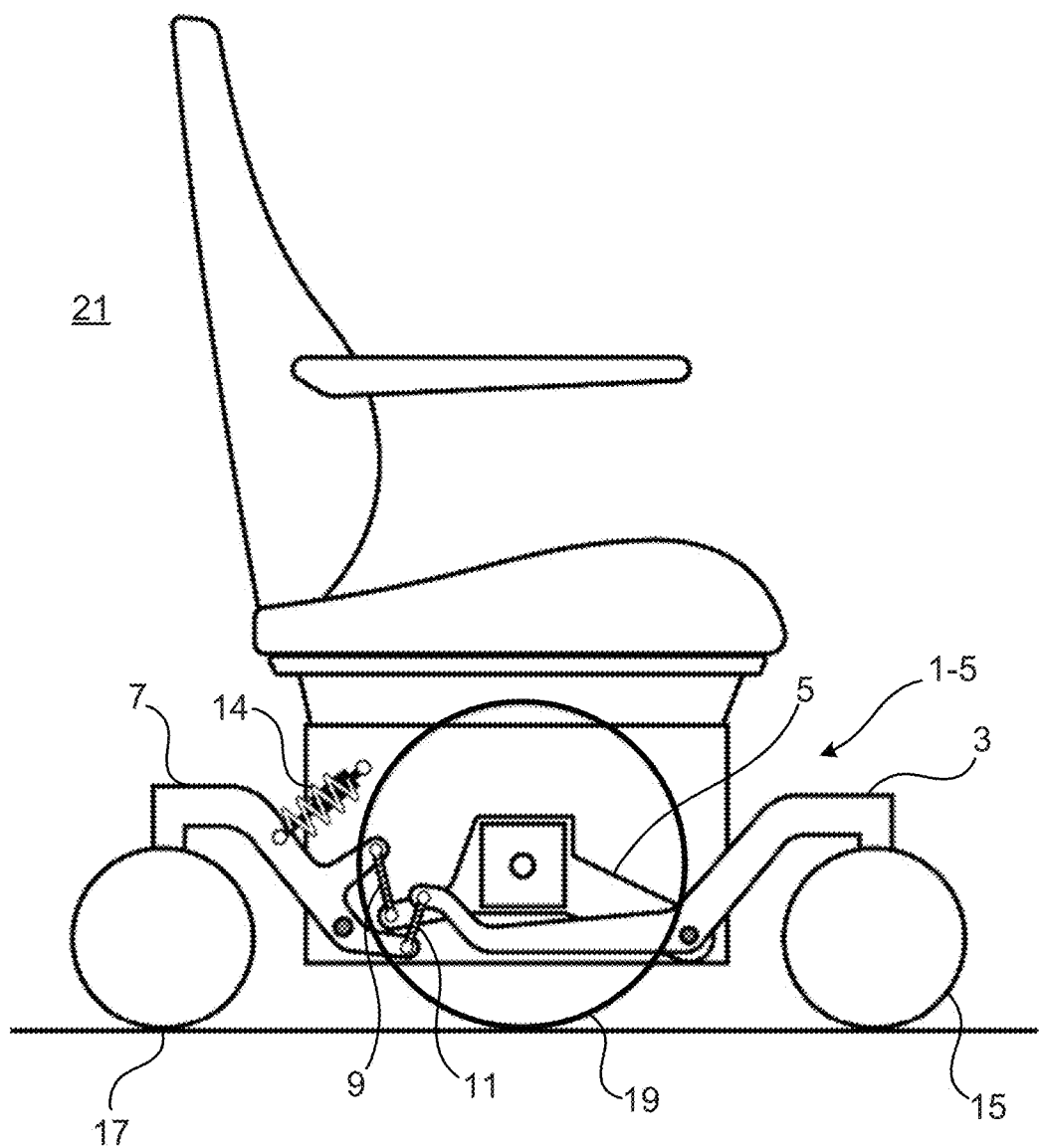
FIG. 2 is a mid-wheel drive wheelchair comprising the swing arm assembly in FIG. 1e.

FIG. 2 shows an example of a mid-wheel drive wheelchair 21, i.e. a wheelchair that is driven by means of a drive wheel 19 arranged between front caster wheels 15 and rear caster wheels 17. The mid-wheel drive wheelchair 21 comprises a seating system 23 for accommodating a user, and the swing arm assembly 1, including the frame 13, with the front swing arm 3, the drive assembly swing arm 5 and the rear swing arm 7 being pivotally mounted to the frame 13. The wheelchair 21 also comprises a drive assembly including a drive motor and a gearbox mounted to the drive assembly pivot arm 5.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A swing arm assembly comprising:
   a front swing arm having a front swing arm pivot point,
   a drive assembly swing arm having a drive assembly swing arm pivot point and a resilient member first mounting point,
   a rear swing arm having a rear swing arm pivot point and a resilient member second mounting point,
   a resilient member configured to be connected to the resilient member first mounting point and to the resilient member second mounting point to enable force transfer between the drive assembly swing arm and the rear swing arm, and
   a linkage member, wherein the front swing arm has a linkage member first mounting point and the rear swing arm has a linkage member second mounting point, and wherein the linkage member is configured to be connected to the linkage member first mounting point and the linkage member second mounting point to enable force transfer between the front swing arm and the rear swing arm.

2. The swing arm assembly of claim 1, wherein the resilient member is configured to be pivotally connected to the drive assembly swing arm via the resilient member first mounting point, and configured to be pivotally connected to the rear swing arm via the resilient member second mounting point.

3. The swing arm assembly of claim 1, comprising a frame, wherein at least one of the front swing arm, the drive assembly swing arm and the rear swing arm is configured to be pivotally connected to the frame with the corresponding swing arm pivot point defining the pivot point of the said swing arm relative to the frame.

4. The swing arm assembly of claim 3, wherein the front swing arm is configured to be pivotally connected to the frame with the front swing arm pivot point defining the pivot point of the front swing arm relative to the frame, the drive assembly swing arm is configured to be pivotally connected to the frame with the drive assembly swing arm pivot point defining the pivot point of the drive assembly swing arm relative to the frame, and the rear swing arm is configured to be pivotally connected to the frame with the rear swing arm pivot point defining the pivot point of the rear swing arm relative to the frame.

5. The swing arm assembly of claim 1, wherein the linkage member is flexible in its longitudinal direction.

6. The swing arm assembly of claim 5, wherein the linkage member is stiffer than the resilient member.

7. The swing arm assembly of claim 1, wherein the resilient member comprises a spring.

8. A mid-wheel drive wheelchair comprising the swing arm assembly of claim 1.

9. A swing arm assembly comprising:
a front swing arm having a front swing arm pivot point,
a drive assembly swing arm having a drive assembly swing arm pivot point and a resilient member first mounting point,
a rear swing arm having a rear swing arm pivot point and a resilient member second mounting point, wherein the rear swing arm pivot point is configured to be spaced apart from the front swing arm pivot point and the drive assembly swing arm pivot point, wherein the front swing arm pivot point is configured to coincide with the drive assembly swing arm pivot point, and
a resilient member configured to be connected to the resilient member first mounting point and to the resilient member second mounting point to enable force transfer between the drive assembly swing arm and the rear swing arm.

10. The swing arm assembly of claim 9, wherein the resilient member is configured to be pivotally connected to the drive assembly swing arm via the resilient member first mounting point, and configured to be pivotally connected to the rear swing arm via the resilient member second mounting point.

11. The swing arm assembly of claim 9, comprising a frame, wherein at least one of the front swing arm, the drive assembly swing arm and the rear swing arm is configured to be pivotally connected to the frame with the corresponding swing arm pivot point defining the pivot point of the said swing arm relative to the frame.

12. The swing arm assembly of claim 11, wherein the front swing arm is configured to be pivotally connected to the frame with the front swing arm pivot point defining the pivot point of the front swing arm relative to the frame, the drive assembly swing arm is configured to be pivotally connected to the frame with the drive assembly swing arm pivot point defining the pivot point of the drive assembly swing arm relative to the frame, and the rear swing arm is configured to be pivotally connected to the frame with the rear swing arm pivot point defining the pivot point of the rear swing arm relative to the frame.

13. The swing arm assembly of claim 9, comprising a linkage member, wherein the front swing arm has a linkage member first mounting point and the rear swing arm has a linkage member second mounting point, and wherein the linkage member is configured to be connected to the linkage member first mounting point and the linkage member second mounting point to enable force transfer between the front swing arm and the rear swing arm.

14. The swing arm assembly of claim 13, wherein the linkage member is flexible in its longitudinal direction.

15. The swing arm assembly of claim 14, wherein the linkage member is stiffer than the resilient member.

16. The swing arm assembly of claim 9, wherein the resilient member comprises a spring.

17. A mid-wheel drive wheelchair comprising the swing arm assembly of claim 9.

* * * * *